United States Patent Office 3,729,548
Patented Apr. 24, 1973

3,729,548
PROCESS FOR SAFELY REACTING
ACTIVE METALS
Charles H. Lemke, Niagara Falls, N.Y., assignor to E. I.
du Pont de Nemours and Company, Wilmington, Del.
No Drawing. Continuation-in-part of application Ser. No.
601,855, Dec. 15, 1966. This application July 31, 1969,
Ser. No. 846,590
Int. Cl. C01b 1/02; C01c 3/08; C01g 1/00
U.S. Cl. 423—371                        7 Claims

ABSTRACT OF THE DISCLOSURE

A safe controllable, convenient process for completely reacting an active metal with a reactive liquid comprising contacting said metal with a dispersion which consists essentially of a reactive liquid phase (e.g., water) dispersed in a continuous nonreactive liquid phase (e.g., inert hydrocarbon oil).

CROSS-REFERENCES TO RELATED APPLICATIONS

This is a continuation-in-part of S.N. 601,855, filed Dec. 15, 1966, now abandoned.

BACKGROUND OF THE INVENTION

Active metals, such as sodium, potassium, lithium, and calcium, are widely used because of their valuable properties. For example, sodium is used in the manufacture of tetraethyl lead due to its chemical reactivity. Sodium's low melting point and excellent heat conductivity, on the other hand, render it valuable as a fluid in certain types of heat exchangers and in the metal quenching operation of the alloy coating art as disclosed in U.S. Pat. 3,184,331. Sodium-filled conductor cables have been reported in the literature and may become increasingly important. The use of alkali metals or alloys thereof as heat exchange media is also of importance. Despite the great differences in the processes employing active metals, there is a common problem concerning the reactivity and disposal of the active metals. Sodium is the most typical of the active metals and is therefore the metal to which much of the discussion hereinafter is directed. It is to be understood, however, that the discussion is equally applicable to the other reactive metals.

The manufacture, handling and use of sodium frequently involve the reaction of the sodium and water to: (1) make sodium hydroxide and hydrogen; (2) clean equipment or articles of manufacture; (3) dispose of sodium residues and waste. This reaction is difficult to control and may produce local temperatures above those tolerable in the equipment. The reaction is, additionally, difficult to use below 316° C. Since the melting point of sodium hydroxide is about 318° C., the compound is solid at 316° C. Consequently, when the temperature is kept relatively low, a crust of solid sodium hydroxide may form over the unreacted sodium. The steam or water utilized eventually dissolves away patches of the crust, whereupon the steam or water suddenly contacts the metal underneath. The high temperatures evolved and the hydrogen gas trapped under the crust then result in violent explosions. Of course, it is well known that when sodium comes in contact with water, hydrogen is liberated which in the presence of air, is likely to ignite. Furthermore, this reaction of the hydrogen with the oxygen in the air may vary well occur with explosive violence. Because of this, sodium disposal has been a difficult problem, especially on a large scale. Several methods have been utilized heretofore to dispose of sodium residues. All, however, suffer from various disadvantages. One method of disposal burns sodium in air. Although effective when special sodium burners are available, this method is inapplicable to sodium held within complex apparatus because the interior thereof cannot be reached. The oxidation of sodium also generates excessive heat, solid residues and smoke which cause air pollution problems.

Previously known methods for the disposal of active metals have involved reacting the metal with an alcohol, or dissolving the metal in anhydrous ammonia. Such methods are disclosed in British Pat. No. 574,360 and by Jackson, "Liquid Metals Handbook-Sodium-Nak Supplement," July 1, 1955, Atomic Energy Commission, Department of the Navy, Washington, D.C. All of these methods previously disclosed suffer from various disadvantages, such as involving flammable and explosive materials, and being expensive and complicated.

It, therefore, is apparent that a more efficient and less hazardous method for reacting and disposing of active metals is necessary. While the art is well aware of many methods for reacting active metals, there is a definite need for a method of reacting and disposing of active metals which is safe, rapid, efficient and which can be operated in remote locations (e.g., in equipment areas not readily accessible).

SUMMARY OF THE INVENTION

This invention relates to a novel and highly useful process for reacting active metals with a reactive liquid under safe, controlled conditions. This process has many advantages over the prior art whether applied to the manufacture of active metal compounds, the cleaning of equipment and articles of manufacture, or the safe disposal of active metal residues and waste.

Basically, the process of this invention provides a safe, controlled method for the complete conversion of active metal to the corresponding metallic compund (e.g., hydroxide, chloride, oxide) by contacting said metal with a dispersion which consists essentially of a reactive liquid phase dispersed in a continuous nonreactive liquid phase. The presence of the relatively large volume of nonreactive liquid phase limits the rate of reaction between the metal and the reactive liquid, and provides a heat sink for the heat of reaction. Depending on the objects to be achieved, the various process parameters may be altered in such a way as to insure that the reaction is kept always under control and that no dangerous buildup of byproduct hydrogen occurs. These parameters include: ratio of reactive liquid to nonreactive liquid, system temperature, choice of liquid phases, agitation, atmosphere employed, salt present, and methods of applying the dispersions.

Simple dipsersion systems consisting of water in a hydrocarbon oil are generally preferred, but in some cases it may be desirable to add surfactants to stabilize the water-oil dispersion or to add anti-foam agents if undesirable foaming is encountered. Acids or other agents may be added if desired for specific applications.

The invention is particularly applicable to sodium metal, but the method of this invention is also applicable to other reactive metals such as lithium, potassium, alloys thereof, calcium and mixtures thereof.

DESCRIPTION OF THE PREFERRED EMBODIMENTS

The process for safely reacting an active, solid metal substance selected from the group consisting of elemental sodium, potassium, lithium, alloys, thereof, calcium, and mixtures thereof with a reactive aqueous liquid comprises:

(a) dispersing said aqueous liquid in the form of small droplets into a continuous inert immiscible hydrocarbon oil phase to form a dispersion;

(b) contacting said active metal substance with the dispersion; and (c) maintaining conditions such that the rate of reaction is safely and slowly controlled by controlling the concentration of the aqueous liquid in said inert liquid phase, controlling the temperature and controlling the rate of the contacting.

The essence of the invention lies in the use of the reactive liquid-nonreactive liquid dispersion which controls the rate of reaction. The reactive liquid phase, which is designated as reactive since it reacts with the active metal, comprises a liquid such as water. The nonreactive liquid phase, which is designated as nonreactive since it does not react with the active metal, comprises a liquid such as an inert, immiscible hydrocarbon oil. For purposes of convenience only, the reactive liquid and nonreactive liquid utilized in this invention may be referred to as water and oil respectively throughout the specification. This is not intended to limit the scope of this invention.

The dispersion is prepared by dispersing the aqueous liquid in the oil phase. This can be accomplished by any conventional means, such as by stirring, blending, agitating, or turbulent flow.

In the dispersion, water, which is a reactant with any of the active metals, is broken into small droplets when in admixture with an inert hydrocarbon oil. This dispersion, which consists essentially of water dispersed in an inert hydrocarbon oil (the continuous phase) limits the rate of reaction and provides a sink for the heat of reaction. It is an essential feature of this invention that the reactive phase (discontinuous phase) is dispersed in the inert nonreactive phase (continuous phase). It is well known that at a certain ratio of the two liquids in a dispersion, an inversion takes place and the continuous phase becomes the discontinuous phase; see Kirk-Othmer, "Encyclopedia of Chemical Technology" (second edition), volume 8, page 127. As pointed out by Kirk-Othmer, the phase volume ratio at the point of inversion is equal to the square root of the ratio of the viscosities of the two liquid components. As previously stated, the reactive liquid must remain as the discontinuous phase dispersed in the nonreactive liquid which is the continuous phase. Therefore, the dispersion which may be utilized in this invention can contain as much reactive liquid as the dispersion can withstand before the point of inversion occurs. In other words, the amount of reactive liquid by volume percent is governed by the point of inversion when the reactive liquid would become the continuous phase. Generally, a water-oil dispersion can contain from 1 to 50 percent by volume of the reactive liquid. However, the amount of reactive liquid which can be utilized while still maintaining the reactive liquid as the discontinuous phase is dependent upon the particular reactive and nonreactive liquids, since the inversion point depends upon the viscosities of the particular liquids utilized. The preferred dispersions of this invention contain from 1 to 50 percent by volume of the reactive liquid. Below 1 percent, there is generally an insufficient amount of reactive liquid to conveniently carry out the reaction between said liquid and the active metal. Above 50 percent, the reaction generally becomes violent and is not as readily controllable. Of course, larger amounts of the reactive liquid may be utilized and still be within the scope of this invention as long as the reactive liquid remains as the discontinuous phase which is dispersed in the continuous phase of the dispersion.

Any kind of water can comprise the aqueous phase; for example, distilled water, rain water, or tap water are usable for purposes of this invention.

The water may also contain various acids or basic compounds (bases) which would react with the active metal to produce the corresponding salts of the acids or bases. For example, if the water contained amounts of hydrochloric acid, the resulting aqueous phase of the dispersion would contain sodium chloride. In like manner, if acetic acid were present in the water of the dispersion, sodium acetate would be produced in the reaction of sodium metal by this invention. Specific examples of acids, bases or other compounds which may be present in the water of the dispersion include: nitric acid, hydrochloric acid, acetic acid, sulfuric acid, sodium hydroxide and hydrogen cyanide.

The nonreactive liquid, which is designated as nonreactive since it does not react with the active metal, will generally comprise an inert hydrocarbon oil. The nonreactive liquid should have a low solubility in water and thus be essentially immiscible with water so that two separate phases are formed in the dispersion. The nonreactive liquid may be any of a wide variety of inert hydrocarbon oils, i.e., oils that are not reactive with the active metal. Examples of such inert hydrocarbon oils include: pentane; cyclopentane, the hexanes, heptanes, octanes, mineral oils, petroleum ether, benzene, the xylenes, toluene, and kerosenes. Particularly suitable are kersosene and mineral oil. Preferred properties of the hydrocarbon oil are that it has a low solubility in water (immiscible), and that the oil not be flammable under operating conditions. While it is preferred that the reactive and nonreactive liquid phases of the dispersion be immiscible to provide the desired control of reaction and to facilitate separation and recovery, limited mutual solubility will not interfere and in some cases may be advantageous.

The metals which are considered to be active metals and present the problems of reactivity and disposal include: sodium, potassium, lithium, alloys thereof, calcium, and mixtures thereof. While calcium does not have the same reactivity and does not present quite the same problems as the other listed metals, it is considered an active metal for purposes of this invention. Moreover, the disposal problems of sodium and calcium are related, especially in the alloy coating-sodium quenching process and therefore, the process of this invention is applicable to calcium as well as sodium.

The active metal is contacted with the dispersion by well known methods, such as by immersing, spraying, coating, etc. When the active metal is contacted with the water in oil dispersion, in certain instances it is desirable, although not necessary, to have vigorous agitation. This is to maintain a uniform dispersion of the immiscible phases and to facilitate dissipation of the heat which is evolved. However, agitation is not necessary to maintain the dispersion. In some instances, it may be desirable to add dispersing agents to stabilize the water-oil dispersion or to add anti-foam agents if undesirable foaming is encountered. Any conventional dispersing agent (nonreactive with the active metal) may be utilized such as glycerol monostearate, polyoxyethylene monolaurate, and those disclosed by Kirk-Othmer, "Encyclopedia of Chemical Technology" (second edition), volume 8, pages 128–130. Similarly, any conventional nonreactive anti-foaming agents may be utilized such as the polysiloxanes, propylene glycol, and 2-ethylhexanol. An obvious situation where a dispersing agent would be added is when the dispersion is used to react with active metals which are trapped in relatively inaccessible places such as pipes, tubing, etc. Since it would be difficult or almost impossible to supply the necessary agitation in restricted areas such as these, surfactants are desirable to stabilize the water in oil dispersion and provide the necessary uniformity of the dispersion for purposes of this invention. Acids or other reagents may also be added if desired for specific applications.

Various other compounds can be used with the water. For example, alcohols (e.g. methanol, ethanol, decanol) or amines can be used. However, while these compounds are operable, their use will not generally be preferred.

The temperature at which the process is carried out is generally a temperature at which the dispersion is liquid, usually within the range of 0 to 100° C. Below the freezing point of the aqueous phase the rate of reaction would be very low. The upper temperature limit is set by the boiling point of the dispersion. However, as the active metal reacts with water to form a salt, the boiling point of the aqueous phase is raised and the melting point is lowered. For example, as sodium reacts with water to form sodium hydroxide, this hydroxide affects the melting and boiling points of the dispersion. These limits are dependent upon the salt (hydroxide, chloride, etc.) concentration in the water. Thus, the process of this invention may be operated at any temperature at which the dispersion is liquid. Additionally, as previously mentioned, various acids, bases or other ingredients may be added to the system. These also affect the melting and boiling points of the aqueous phase. Therefore, it is conceivable that the process of this invention may be operated at 200° C. or higher, depending on the particular acid, base, hydroxide, etc. which is present in the reaction system. Similarly, the lower temperature limit of the process can be below 0° C. due to the presence of salts resulting from the addition of the other ingredients (acids, bases, alcohols, etc.).

In the case of sodium it has been found advantageous to operate at or near the melting point of the metal (98° C.). At such temperatures the rate of the reaction at any given water concentration tends to increase substantially, yet the process can still be carried out without going out of control. It is preferred to operate near the melting point of sodium, potassium or lithium, but substantially below the melting point of calcium which is too high for practical purposes.

It should be pointed out that two of the most important variables of the process are: (1) temperatures and (2) the volume concentration of the reactive liquid phase in the dispersion. By adjusting these two variables of the process the reaction can be carried out at any desirable rate and still be under safe and controllable conditions. These variables are related to the buildup of salts in the reactive liquid phase in the dispersion system. As previously described, the salts are formed from the reaction of the active metals and reactive liquid. This buildup of salts in the dispersion decreases the concentration of the reactive liquid phase and therefore decreases the reaction rate. In order to maintain a constant or acceptable rate of reaction, the following alternatives are available: (a) the temperature of the reaction can be raised; (b) the concentration of the reactive liquid phase in the dispersion can be increased; or (c) the salts can be removed from the dispersion by a conventional separation process. Thus, the temperature and concentration are key variables in this process.

The process of this invention is designed to completely react with all of the active metal. The term "completely" as used herein indicates that the reaction between the metal and the reactive liquid phase has essentially come to an end and that essentially all of the metal has been reacted to form its corresponding salt(s). Therefore, it is necessary to have an amount of the reactive liquid phase present in the reaction system which is at least stoichiometrically equal to and is preferably in excess of the amounts of active metal to be reacted. In addition to completely reacting with all of the active metal, having an excess of reactive liquid present in the system maintains the dispersion in the liquid state throughout the reaction process. For example, if a water-in-oil dispersion, which contained 1 percent water and 99 percent oil is to be reacted with a large quantity of sodium, then very large quantities of the dispersion must be utilized to completely react with all of the sodium. It is not within the scope of this invention to prepare dispersions of the active metals themselves in the water-oil dispersions utilized herein. Such dispersions of an active metal are known and disclosed by U.S. Patent 3,012,974 and are not encompassed by this invention.

The atmosphere employed in this process is important. If an oxygen-containing gas is used, conditions of ventilation must be such that an explosive mixture with the by-product hydrogen cannot be formed. On the other hand, if an inert atmosphere is used (e.g., nitrogen, argon), there is no need for ventilation since the risk of explosion would be eliminated.

The process of this invention can be operated as a batch or continuous process. In a continuous process, the salts which are formed from the reaction of the reactive liquid and the active metal gradually build up in the system. Consequently, moderate amounts of the reactive liquid phase should be continually removed from the system and replaced with fresh reactive liquid corresponding to the amount of reactive liquid that is reacted. Of course, in a batch process the metal and dispersion are simply placed in a container and allowed to completely react.

Following the complete reaction of the active metals in a batch process, if desired the two phases of the dispersion can be separated to recover the nonreactive liquid for reuse and to recover the metal salts (usually in the reactive phase) for further processing or use. In a continuous process the same separation technique is employed, but the separation is preferably done in a continuous manner; that is, a portion of the dispersion is continuously removed to a separation zone or container where the phases can separate and be decanted. The nonreactive phase can be recycled to the continuous process while the salt-containing reactive phase can be saved for further processing or use.

The invention is illustrated by the following examples.

Example 1

A charge consisting of 22.5 gallons of mineral white oil and 7.5 gallons of water was added to an open 55-gallon steel drum. This charge was vigorously agitated with an air-driven agitator to effectively disperse the water in the oil phase. Heat was applied to raise the temperature of the system to 90–95° C. To the hot dispersion which was under continual agitation, one pound of metallic sodium was added. Rapid reaction occurred to form sodium hydroxide and hydrogen. When the reaction was complete, the agitator was stopped and the system was allowed to stand quiescent with the heat turned off. Twelve hours later, the oil and water phases were found to have separated into layers and the oil layer was easily decanted off for reuse. The water phase containing the hydroxide was saved for further processing and use. Of course, there is no necessity for allowing the oil and water phase to separate if the reaction products are not to be recovered.

The process of this invention has many applications in addition to the above method of safely, conveniently, and controllably reacting sodium or any other active metal to form the metal hydroxide or salt. For example, there is a sodium disposal problem that exists in connection with sodium-filled polyethylene tubing which is designed for use in electrical conductor cable. Used or scrap cable is not amenable to the common sodium burning disposal technique since the inert polyethylene severely restricts burning while at the same time producing large quantities of noxious smoke. By use of the process of this invention, the sodium can be removed from the polyethylene tubing by a safe and convenient method not known heretofore. This is demonstrated by the following example.

Example 2

A charge consisting of 30 gallons of mineral white oil and 1 gallon of water was placed in an open-top, 55-gallon drum. The drum was fitted with an air-driven agitator and a source of electrical heating. The agitator was run at a speed sufficient to achieve a uniform dispersion of the water in the oil phase. To this system, pieces of polyethylene tubing filled with sodium were added in order to remove the sodium core. The tubing was approximately ½ inch outside diameter, while the sodium core was approximately ⅜ inch diameter; the pieces varied in length from about 2 inches to 14 inches. In some cases the short pieces were split longitudinally to achieve greater exposure of the sodium to the cleaning medium. In initial trials the temperature of the system was 30° C., and it was found that reaction proceeded at the exposed surface of the sodium very quietly and slowly. The temperature of the system was raised stepwise, finally reaching a temperature of 98° C. At various intervals, additional water was added to the reacting system until the final water concentration was about 20% of the total dispersion volume.

It was observed that each increase in water content resulted in an increase in reaction rate, but the increase in temperature appeared to be more effective in increasing reaction rate than increasing water content. During the final stages of the process with the water present at approximately 20% of the dispersion volume and with the system temperature at about 98° C., the reaction to convert sodium to sodium hydroxide with the liberation of hydrogen was very rapid. The short pieces of cable were completely cleaned in a minute or less, but the reaction was under control at all times and was at no time violent or hazardous. The resulting clean polyethylene was separated from the dispersion and adaptable for any further desired use.

Long lengths of the sodium-filled polyethylene conductor cable can be disposed of on a continuous basis (with regard to the sodium content) by feeding the cable through a splitter to split the cable longitudinally. Thereafter the split cable is fed into a tank containing the dispersion and the continuous process of this invention is operated as previously described. The clean split polyethylene tubing is continuously withdrawn from the tank onto a take-up reel.

The process of this invention is also useful in the alloy coating art. When the coated metal is removed from a calcium bath, in which a metal is alloy coated, a portion of the calcium freezes on the metal surface, and then becomes covered with sodium during the subsequent quenching operation. This is described in U.S. Pat. 3,413,142. Both the calcium and the sodium must be removed prior to completion of the processing of the coated article. By the process of this invention, this sodium and calcium can easily be removed. This is demonstrated by the following example.

Example 3

A steel vessel approximately 12 inches in diameter and 15 inches high was utilized to hold a dispersion system of about 14 liters of white mineral oil and the amounts of water noted in Table I. Vigorous agitation was provided by a three-blade agitator, 2 inches in diameter, driven at high speed by an air motor. A small air blower was arranged to discharge over the surface of the liquid in the vessel to sweep out hydrogen which was formed.

Panels of 0.1 inch thick steel coated with an inner layer of calcium metal and an outer layer of sodium metal (prepared in accordance with U.S. Pat. 3,184,331) were dipped in this system. The extent of the reaction was noted at intervals by removing the panel(s) briefly for examination. The data recorded during the experiment are summarized in Table I.

TABLE I

| Total H₂O, vol. percent | Panel size | Bath temp., °C. | Treatment time, min. | Observations |
|---|---|---|---|---|
| 5 | 2½″ x 5″ | 25 | 20 | Sodium substantially gone.[1] |
| 5 | 4″ x 8″ | 28-30 | 60 | Do.[1] |
| 7 | 4″ x 8″ | 30 | 30 | Do.[1] |
| 7 | 4″ x 8″ | 55 | 20 | Do.[1] |
| 7 | 4″ x 8″ | 70 | 15 | Do.[1] |
| 7 | 4″ x 8″ | 85 | 5 | Sodium completely gone.[2] |
| 7 | 4″ x 8″ [3] | 95 | 3 | Do.[2] |
| 7 | 4″ x 8″ [3] | 95 | 5 | Calcium substantially gone. |
| 9 | 4″ x 8″ | 70 | 5 | Sodium completely gone.[2] |

[1] Only slight reaction of calcium.
[2] Moderate reaction of calcium.
[3] Same piece.

It can be readily observed that by manipulating the time, temperature, and concentration variables of this process, sodium and calcium can be controllably reacted.

In the manufacture of sodium by the molten NaCl electrolysis process, a sludge is formed. This is common knowledge as disclosed by Sittig, "Sodium, Its Manufacture, Properties and Use" (1956), page 34, and U.S. Patents 2,071,126 and 2,073,631. The sludge commonly referred to in the trade as sodium filter scrap, contains approximately 70% sodium, 20% calcium, and 10% of the corresponding chlorides and oxides. By using the process of this invention, a safe, economical process for the disposal of sodium filter scrap is achieved. The sodium scrap filter is converted to sodium and calcium salts and hydrogen. This is demonstrated by the following example.

Example 4

Six hundred ml. of white mineral oil and 300 ml. of water were charged into a stirred vessel. This charge was agitated by operating the agitator at a medium rate. Then 1 gram of sodium filter scrap was added to the blender while the process was operated at room temperature (20° C.) The rate at which the water-in-oil dispersion reacted with the sodium filter scrap was determined by the evolution of hydrogen resulting from the reaction of free sodium and calcium in the scrap with the water of the dispersion. The agitator was operated at 550 r.p.m. throughout the process. The following results were obtained:

| Time (seconds): | Hydrogen evolved (liters) |
|---|---|
| 0 | 0 |
| 10 | 0.1 |
| 20 | 0.17 |
| 30 | 0.22 |
| 45 | 0.30 |
| 60 | 0.36 |
| 75 | 0.41 |
| 90 | 0.42 |
| 105 | 0.43 |

At the end of two minutes, the sodium filter scrap had been safely and completely converted to sodium hydroxide, calcium hydroxide and hydrogen.

Example 5

Using the same materials and conditions described in Example 4, except for the agitation speed which was increased to 800 r.p.m., the following results were obtained:

| Time (seconds): | Hydrogen evolved (liters) |
|---|---|
| 0 | 0 |
| 5 | 0.1 |
| 10 | 0.15 |
| 30 | 0.42 |
| 40 | 0.46 |

Comparison of the results from Examples 4 and 5 demonstrates the effect of increased agitation in the process of this invention. It can be readily seen by the hydrogen evolution data that the process proceeded at a faster rate when subjected to more vigorous agitation. However, a safe and controllable process was in operation at all times.

Another important use of the present process is in cleaning heat exchange media such as sodium-cooled reactors. In the past it has been very difficult to provide a safe method to clean sodium-cooled reactors. However, by using the process of this invention the reactors can be safely and conveniently cleaned. Generally, this process for cleaning reactors, pipes, tubing, and various other types of equipment is a very simple one. The dispersions of this invention are pumped through the equipment to react with active metal residues which are located throughout various locations in the equipment. Ventilation should be provided to permit evolved hydrogen to dissipate. Thus, by simply pumping the dispersion into the equipment and withdrawing the dispersion at designated time intervals, various types of equipment can be safely cleaned.

It should be pointed out that the water-in-oil dispersions of this invention can be applied by any conventional "contacting" technique. For example, the active metal containing articles can be dipped into the dispersion; or the dispersion can be sprayed onto various surfaces which contain active metals. Additionally, the dispersion can be pumped through a pipe or a machine which contains an active metal. This invention is in no way limited to any particular method of contacting the water-in-oil dispersions with the active metals. The following example demonstrates the spraying technique.

Example 6

A dispersion containing 7% by volume of water in kerosene was prepared by admixing the two liquids and vigorously agitating the liquid system. The dispersion was placed in the sump of a rectangular tank. This tank was equipped with 3 spray heads mounted on each of two opposite side walls. A gear pump having a capacity of about 5 gallons per minute was utilized to circulate the dispersion from the sump through the spray head. The process was operated at room temperature (20° C.). Several alloy coated, sodium quenched steel panels were suspended between the sprays. The dispersion was sprayed onto the panels and the panels were rapidly (2-3 minutes) cleaned of sodium without flashing or popping. To speed up the removal of calcium a little glacial acetic acid was added to the dispersion and the calcium was then more rapidly removed.

Of course, as previously discussed, various other ingredients such as hydrochloric acid or hydrogen cyanide could be added in place of the acetic acid to produce other desirable effects. Thus, if hydrogen cyanide were added to an oil-in-water dispersion, sodium cyanide would be one of the resulting products produced by this invention.

The atmosphere which may be employed in the process of this invention is not of any inventive significance. Either air, hydrogen, or an inert gas (argon, krypton, nitrogen) may be used. If air is the atmosphere utilized, it is essential to avoid explosive mixtures of air and the hydrogen which is being evolved by the process. This can be easily accomplished by providing a suitable stream of air to dilute the hydrogen to the nonexplosive range. The choice of a particular atmosphere is left to those skilled in the art.

By using the teachings of this invention, various active metals can be disposed of in a safe, convenient and controllable manner. The novel use of the reactive liquid phase-nonreactive liquid phase dispersions provides a safe method for converting metals to their metallic salt and hydrogen without encountering the heat, flammability, explosiveness, and other related problems of prior methods.

I claim:

1. A process for safely reacting an active, solid metal substance selected from the group consisting of elemental sodium, potassium, lithium, alloys thereof, calcium, and mixtures thereof with a dispersion of a reactive aqueous liquid in a liquid which is non-reactive with the active metal substance by controlling temperature, ratio of reactive liquid to non-reactive liquid, contact of the reactants and atmosphere which comprises:
   (a) dispersing in the form of small droplets from 1–50 volume percent of the reactive aqueous liquid as a discontinuous phase in to a continuous immiscible hydrocarbon oil phase to from a dispersion;
   (b) contacting the active metal substance at a temperature at which the dispersion is liquid with a quantity of the dispersion containing an amount of reactive liquid at least stoichiometrically equal to the amount of active metal substance to be reacted; and
   (c) agitating the dispersion-active metal mixture under conditions of ventilation such that an explosive mixture of by-product hydrogen cannot be formed whenever harmful amounts of oxygen are present.

2. A process in accordance with claim 1 wherein the dispersion is agitated while the active metal is contacting and reacting with the aqueous liquid phase.

3. A process in accordance with claim 1 wherein the dispersion contains a dispersing agent.

4. A process in accordance with claim 1 which is carried out in the presence of air.

5. A process in accordance with claim 1 wherein the contacting is carried out by dipping the active metal into the dispersion.

6. A process for safely reacting sodium sludge filter scrap which results from the manufacture of sodium, with a dispersion of a reactive aqueous liquid in a liquid which is non-reactive with sodium by controlling temperature, ratio of reactive liquid to non-reactive liquid, contact of the reactants and atmosphere which comprises:
   (a) dispersing in the form of small droplets from 1–50 volume percent of the reactive aqueous liquid as a discontinuous phase into a continuous immiscible hydrocarbon oil phase to form a dispersion;
   (b) contacting the sludge at a temperature at which the dispersion is liquid with a quantity of the dispersion containing an amount of reactive liquid at least stoichiometrically equal to the amount of sodium to be reacted; and
   (c) agitating the resulting mixture under conditions of ventilation such that an explosive mixture of by-product hydrogen cannot be formed whenever harmful amounts of oxygen are present.

7. A process for safely reacting an active, solid metal substance selected from the group consisting of elemental sodium, potassium, lithium, alloys thereof, calcium and mixtures thereof with a dispersion of water and hydrogen cyanide in a liquid which is non-reactive with the active metal substance by controlling temperature, ratio of reactive liquid to non-reactive liquid, contact of the reactants and atmosphere which comprises:
   (a) dispersing in the form of small droplets from 1–50 volume percent of the reacting aqueous liquid as a discontinuous phase into a continuous immiscible hydrocarbon oil phase to form a dispersion;
   (b) contacting the active metal substance at a temperature at which the dispersion is liquid with a quantity of the dispersion containing an amount of reactive liquid at least stoichiometrically equal to the amount of active metal substance to be reacted; and
   (c) agitating the dispersion-active metal mixture under conditions of ventilation such that an explosive mixture of by-product hydrogen cannot be formed whenever harmful amounts of oxygen are present whereby the resulting reaction product contains a cyanide salt of the active metal substance.

References Cited

UNITED STATES PATENTS

| | | | |
|---|---|---|---|
| 3,012,974 | 12/1961 | Robinson et al. | 23—87 X |
| 3,459,493 | 8/1969 | Ross | 23—79 X |
| 2,527,443 | 10/1950 | Padgitt | 23—211 X |
| 2,660,517 | 11/1953 | Padgitt | 23—211 X |
| 3,287,085 | 11/1966 | Jenks et al. | 23—79 |

OTHER REFERENCES

Article: "Sodium Dispersions," by E. I. du Pont de Nemours & Co., Wilmington, Del. comprising pp. 1–11, distributed Jan. 25, 1952.

EDWARD STERN, Primary Examiner

U.S. Cl. X.R.

423—648, 657, 659